United States Patent [19]

Danielsen et al.

[11] 3,859,471

[45] Jan. 7, 1975

[54] REED SWITCH COMMUNICATION NETWORK ENSURING OPEN CONTACTS BEFORE CLOSURE

[75] Inventors: Daniel Danielsen; Raymond Waibel Ketchledge, both of Wheaton, Ill.

[73] Assignee: Bell Telephone Laboratories, Incorporated, Murray Hill, N.J.

[22] Filed: May 29, 1973

[21] Appl. No.: 364,978

[52] U.S. Cl. .......................... 179/18 GF, 340/166 S

[51] Int. Cl. .......................................... H04m 1/52

[58] Field of Search ............ 179/18 GF; 340/166 S; 335/151, 152, 159, 161

[56] References Cited

UNITED STATES PATENTS 3,251,036 5/1966 Smith ............................ 179/18 GF 3,348,075 10/1967 Wagar ............................ 340/166 S 3,448,435 6/1969 Billhardt ......................... 340/166 S

*Primary Examiner*—Kathleen H. Claffy

*Assistant Examiner*—Gerald L. Brigance

*Attorney, Agent, or Firm*—J. C. Albrecht

[57] ABSTRACT

A switching network is disclosed which employs magnetically operated sealed reed switches having reeds of a remanent magnetic material. Circuitry is included in the control portion of the network to preclude the possibility of sticking contacts. This circuitry provides for generating magnetic fields in switches selected to be operated to assure that the contacts of the selected switches are in the open condition prior to subjecting the contacts of the selected switches to contact closing magnetic fields.

9 Claims, 3 Drawing Figures

Patented Jan. 7, 1975

3,859,471

2 Sheets-Sheet 2

REED SWITCH COMMUNICATION NETWORK ENSURING OPEN CONTACTS BEFORE CLOSURE

BACKGROUND OF THE INVENTION

This invention relates to the control of telephone switching networks employing differentially wound ferreed switches having remanent magnetic reeds.

A ferreed switch may be defined as a switch wherein for the alternate state, operated and released, of the switch contacts there exist corresponding alternate saturated magnetic contact control paths. In U.S. Pat. No. 3,037,085, which issued May 29, 1962, T. N. Lowry disclosed an arrangement for controlling ferreed switches. That arrangement employs differentially wound control windings wherein two control windings are utilized each comprising two coils proportioned and of winding senses such that concurrently energizing the two windings will effect closure of switch contacts and energizing either of the windings alone will effect release of switch contacts.

This invention is concerned with a problem which may occur in the control of differentially wound ferreed switches which comprise remanent magnetic reeds. Specifically, when contact closing magnetic fields are applied to priorly closed remanent reed contacts, magnetostrictive forces effect a rubbing between the contacts which may cause a blemish in the contact surface material which in turn may eventually result in the contacts sticking together.

SUMMARY OF THE INVENTION

In accordance with the present invention, a switching network employing differentially wound switches having remanent magnetic reeds comprises circuitry for generating magnetic fields in switches selected to be closed to assure that the contacts of the selected switches are in the open condition prior to subjecting the contacts of the selected switches to contact closing magnetic fields.

DESCRIPTION OF THE DRAWING

This invention will be understood from the following description of the illustrative embodiment when read with respect to the drawing in which.

DETAILED DESCRIPTION

Figure 1:
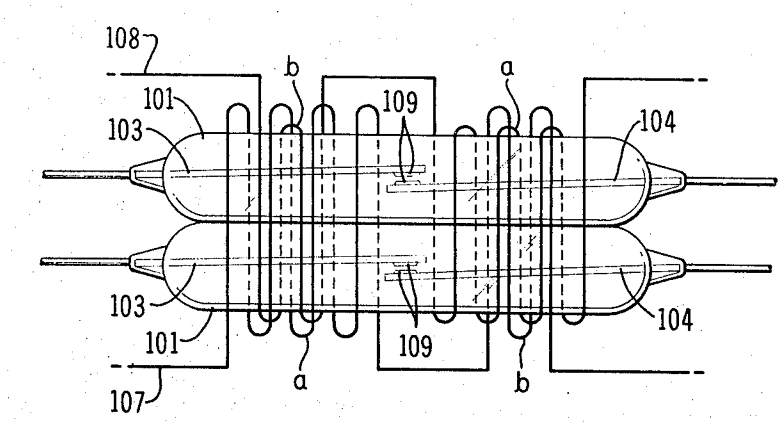
FIG. 1 illustrates a differentially wound switch having remanent magnetic reeds.
Figure 2:
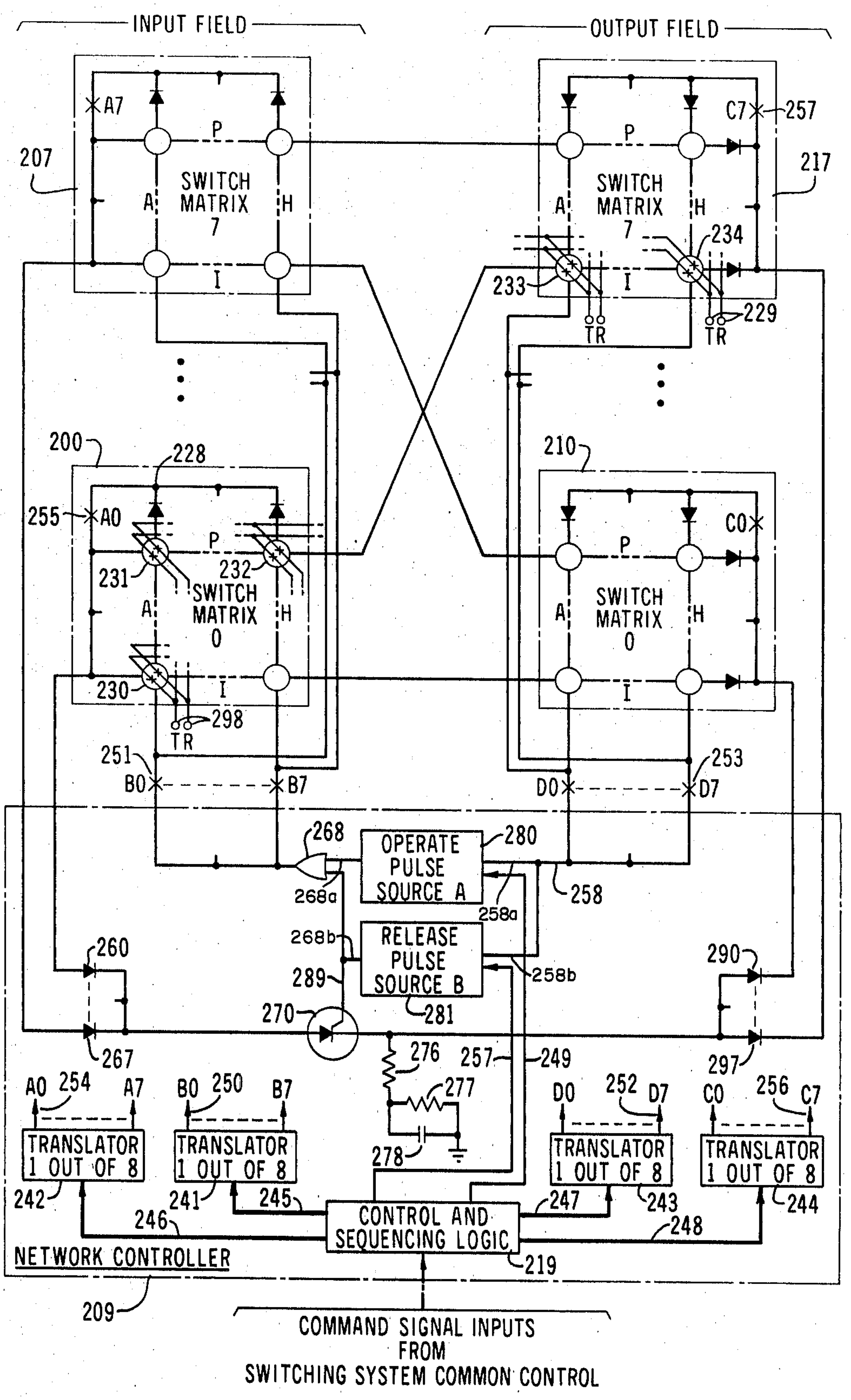
FIG. 2 illustrates a switching network in accordance with the present invention.

FIG. 1 depicts a switch of the type employed in the illustrative switching network of FIG. 2. The switch comprises the remanent magnetic reeds 103, 104 suspended in the glass envelopes 101. The reeds 103, 104 are responsive to the magnetic fields produced by two control windings 107, 108. Each control winding 107, 108 comprises an *a* coil and a *b* coil. The *a* and *b* coils have disparate number of turns and are arranged in opposite winding senses. Concurrent energization of the windings 107 and 108 generates net electromagnetic fields which tend to drive the reeds 103, 104 into corresponding states of magnetic saturation. The resulting remanent magnetization of the reeds is such that opposite magnetic poles exist at both the free ends and the supported ends of the reeds. These magnetic conditions cause the contacts 109 at the free ends of the reeds to close. Energization of either winding 107 or 108 alone generates electromagnetic fields of opposite polarity about the reeds 103 and 104 and these fields tend to drive the reeds into corresponding states of magnetic saturation. However, the resulting remanent magnetizations of the reeds is such that magnetic poles of the same polarity exist at both the free ends and the supported ends of the reeds and this causes the contacts 109 to open. In summary, the switch contacts close when the windings 107 and 108 are energized simultaneously with currents of appropriate senses and the switch contacts open when either winding 107 or 108 is energized alone. The sense of the current flowing in the windings 107, 108 in the case that only one winding is energized in unimportant since current of either sense will effect opening of the contacts.

The illustrative embodiment of FIG. 2 comprises:

a. the input field of eight matrices of switches 200 through 207;

b. the output field of eight matrices of switches 210 through 217;

c. the transmission paths which the illustrative network serves to interconnect; and d. the network controller 209.

Each of the switch matrices 200 through 207 and 210 through 217 comprises 64 switches of the type illustrated in FIG. 1 arranged in an 8 × 8 array. The control windings of the switches of a matrix are connected in the columns A through H and the rows I through P of the coordinate array. Each switch has one control winding, e.g., 107, series connected in a row of the 8 × 8 array and its other control winding, e.g., 108, series connected in a column of the array. Each row of a switch matrix, e.g., 200, of the input field has a link connection to a row of a matrix, e.g., 210, of the output field. The control wires and the connecting links of FIG. 2 are paralleled by transmission paths in which the switch contacts are serially connected. The purpose of the switching network is to interconnect transmission paths between circuits which terminate on switches of the input field and circuits which terminate on switches of the output field.

The network controller 209 generates control signals which serve to selectively operate a switch of a matrix of the input field and a switch of a matrix of the output field so as to provide the desired transmission connection. A switch of the input field and a switch of the output field are selectively operated by applying an operate signal generated by the operate pulse source 280 to a control path which comprises the row and column windings of the two selected switches in series. The network controller 209 operates in response to command signals from a common control which is not shown since the details of the common control and its operation is not necessary to an understanding of the present invention.

In the illustrative embodiment of FIG. 2, a portion of the control path, namely, that portion which comprises the row winding of both selected switches, is bypassed by a parallel connection which is momentarily closed. Accordingly, in the illustrative embodiment a release signal generated by the release pulse source 281 and applied to the control path traverses only one winding of each selected switch and this tends to establish remanent magnetic states in the selected switches such that the contacts thereof are opened.

In the illustrative embodiment the translators 241, 242, 243, and 244 serve to define a control path in response to binary coded signals generated by the control and sequencing logic 219. These signals respectively define a column of the input field of matrices, an input field matrix, a column of the output field matrices, and an output field matrix. In response to a binary coded input signal the translator 241 applies a control signal to one of eight wires B0 through B7 to effect closure of one of the corresponding eight contacts B0 through B7 thereby connecting corresponding columns of the input field to output 268*a* of operate pulse source 280 and output 268*b* of release pulse source 281 via the OR gate 268. Similarly, translator 243 by applying a control signal to one of the eight wires D0 through D7 effects closure of one of the corresponding switch contacts D0 through D7 to connect corresponding columns of th output field to output 258*a* of operate pulse source 280 and output 258*b* of release pulse source 281 via line 258. The details of the pulse sources 280 and 281 are readily envisioned by one skilled in the art and need not be further described for an understanding of the principles of this invention other than noting the character of the output pulses generated. It may be remarked that one well-known pulse source is contemplated for each of the sources 280 and 281 in which the output circuitry includes a transformer coupling. The outputs 268*a* and 258*a* and the outputs 268*b* and 258*b* may thus be understood as connected to opposite ends of respective transformer secondary windings. The translator 242 by applying a control signal to one of the eight wires A0 through A7 effects closure of one of the corresponding contacts A0 through A7 to series connect the rows and columns of an input field matrix. Similarly, the translator 244 by applying a control signal to one of the eight wires C0 through C7 effects closure of one of the corresponding contacts C0 through C7 to series connect the rows and columns of an output field matrix.

In the illustrative embodiment, the silicon controlled rectifier (SCR) 270 serves as a parallel connection to bypass the row windings of the selected switches. The anode of the SCR 270 is connected to the rows of the input field matrices 200 through 207 by the diodes 260 through 267, respectively, and the cathode is connected to the rows of the output field matrices 210 through 217 by the diodes 290 through 297, respectively. The network comprising the resistors 276, 277 and the capacitor 278 is connected to the anode of SCR 270 in accordance with priorly known design principles to assure that the SCR 270 will turn on when a signal is applied to its control input and turn off when the signal is removed. The SCR 270 is turned on by a release signal generated by the release pulse source 281 and when turned on provides a low impedance path in parallel with the row windings.

Figure 3:
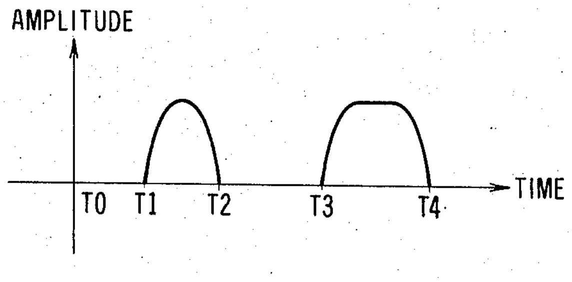
FIG. 3 is a timing diagram illustrating the timing relationship between release and operate signals employed in the network of FIG. 2.

FIG. 3 illustrates one example of the relative timing of an operate and a release signal at the output of the OR gate 268. Assume that at time TO the control and sequencing logic 219 receive input command signals from the switching system common control which serve to indicate that the switches 231 and 234 are to be closed thereby connecting a transmission path between the input terminals 298 and the output terminals 299. The control and sequencing logic 219 in response to the input command signals applies binary coded signals to the translators 241, 242, 243, and 244 via the conductor groups 245, 246, 247, and 248, respectively. The binary coded signals respectively define column A of the input field, the matrix 200, column H of the output field, and the matrix 217. In response to the binary coded signals, the translators 241, 242, 243, and 244 apply control signals to the respective lines 250, 254, 252, and 256 which causes the respective contacts 251, 255, 253, and 257 to close. A control path is thereby defined which comprises column A and row P of the matrix 200 which intersect at the switch 231 and column H and row I of the matrix 217 which intersect at the switch 234.

At time T1 the control and sequencing logic 219 applies a control signal via line 257 to the release pulse source 281. The release pulse source 281 responds by generating a release signal which is applied to the control input of the SCR 270 via line 289 causing the SCR 270 to turn on. The release signal is also applied to the control path via the OR gate 268. Row P of the matrix 200 and row I of the matrix 217 are bypassed when the SCR 270 is turned on. Therefore, the release signal is transmitted over a control path which comprises column A of the matrix 200 and column H of the matrix 217 which are connected together by the SCR 270. The column windings of the selected switches 231 and 234 are traversed by the release signals which tend to establish remanent magnetic states such that the contacts associated therewith will open. At the time T2 the release signal ends and the SCR 270 turns off.

At time T3 the control and sequencing logic 219 applies a control signal to the operate pulse source 280 via the line 249. In response thereto the operate pulse source 280 applies an operate signal via the OR gate 268 to the previously defined control path which comprises column A and row P of the matrix 200 and column H and row I of the matrix 217. The row and column windings of the selected switches 231 and 234 thereby receive operate signals which tend to establish remanent magnetic states such that the contacts thereof will close.

In summary, selected switches are operated in the following manner. A switch control path is selected in the matrices which comprise the row and the column windings of the selected switches in series. A portion of the control path, namely that portion which comprises the row windings of both selected switches, is bypassed by a parallel connection which is momentarily closed. A release signal which is applied to the control path while the parallel connection is closed tends to establish remanent magnetic states in the selected switches such that the contacts thereof are opened. At an appropriate time after the parallel connection opens, an operate signal is applied to the control path and serves to establish remanent magnetic states in the selected switches such that the contacts thereof are closed. Thus, if the contacts of the selected switches are priorly in the closed condition they are positively opened prior to being subjected to contact closing fields.

It is to be understood that the above described arrangement is merely illustrative of the application of the principles of the invention. Numerous other arrangements may be devised by those skilled in the art without departing from the spirit and scope of the invention. For example, other pulse sequences and connections may be used to obtain the same end results.

What is claimed is:

1. A switching network comprising:
a plurality of switches each comprising:
a pair of remanent magnetic circuit members; a pair of switch contacts disposed respectively on said pair of circuit members; a first control winding comprising serially connected first and second coils wound around one of said circuit members and the other of said circuit members respectively; a second control winding comprising serially connected first and second coils wound respectively around said other of said circuit members and said one of said circuit members respectively;
said first and second coils around each said circuit member proportioned and of winding senses such that said first and said second control windings, when energized simultaneously, generate magnetic fields which tend to effect closure of said switch contacts and such that fields of either said first or said second control winding alone tend to effect opening of said switch contacts;
said first and said second control windings of said plurality of switches serially connected respectively in rows and columns;
means for selectively generating contact closing magnetic fields for said switches comprising: means for serially connecting said rows and columns; and means for applying signals selectively to said rows and columns;
characterized in that
said switching network further comprises means for generating contact opening magnetic fields in switches selected to be closed immediately prior to generation of said contact closing magnetic fields.

2. A switching network in accordance with claim 1 characterized in that
said means for generating contact opening magnetic fields comprises: switching means connected in parallel with said rows; and means for controlling said switching means.

3. A switching network in accordance with claim 2 characterized in that
said means for controlling said switching means comprises: means for causing said switching means to assume a conductive state; and means for concurrently applying signals selectively to said columns.

4. A switching network in accordance with claim 2 characterized in that
said switching means comprises a silicon controlled rectifier.

5. A switching network comprising:
first and second switching stages, each comprising:
a plurality of switches arranged in a matrix;
each of said switches comprising: a pair of remanent magnetic circuit members; a pair of switch contacts disposed, respectively, on said pair of circuit members; a first control winding comprising: a first coil of $n$ turns wound around one of said circuit members and connected in series therewith a second coil of $2n$ turns wound around the other of said circuit members; a second control winding comprising a first coil of $n$ turns wound around said other of said circuit members and connected in series therewith a second coil of $2n$ turns wound around said one of said circuit members; said first and second coils of said first and second control windings have winding senses such that said first and second control windings, when energized simultaneously, generate magnetic fiels which tend to effect closure of said switch contacts and such that either said first control winding or said second control winding, when energized alone, tends to effect opening of said switch contacts; said first and said second control windings of said plurality of switches serially connected respectively in rows and columns; one end of each row being connected to a first common point and one end of each column being connected to a second common point;
a first switch connected to said first common point and to said second common point of said first stage;
a second switch connected to said first common point and to said second common point of said second stage;
link connections between rows of said first stage and rows of said second stage;
a network controller comprising: means for generating control signals; a first pulse source connected to said means for generating control signals and comprising first and second output terminals; said first pulse source is responsive to certain of said control signals; a first plurality of switches connected to said first output terminal of said first pulse source and connected respectively to columns of said second stage; a second plurality of switches connected respectively to columns of said first stage; means connecting said second plurality of switches to said second output terminal of said first pulse source; and means connected to said means for generating control signals and responsive to said control signals for operating said first and said second switches, and for selectively operating said first plurality and said second plurality of switches;
characterized in that
said network controller further comprises:
means connected to said rows of said first and said second stages for bypassing said rows of said first and said second stages.

6. A switching network in accordance with claim 5 characterized in that
said means connected to said rows of said first and said second stages comprises:
switching means connected to said first common point of said first stage and said first common point of said second stage; and
means connected to said switching means for controlling said switching means.

7. A switching network in accordance with claim 6 characterized in that
said switching means comprises:
input and output terminals;
means connecting said input terminal of said switching means to said first common point of said first stage;
means connecting said output terminal of said switching means to said first common point of said second stage;
and means for connecting said input terminal of said switching means to said output terminal of said switching means.

8. A switching network in accordance with claim 6 characterized in that
said means connected to said switching means comprises:

a second pulse source connected to said means for generating control signals responsive to certain other of said control signals and comprising: a first terminal connected to said switching means; a second terminal connected to said first plurality of switches; and said means connecting said second plurality of switches to said second output terminal of said first pulse source further comprises: means connecting said second plurality of switches to said first terminal of said second pulse source.

9. A switching network in accordance with claim 6 characterized in that said switching means comprises a silicon controlled rectifier.

* * * * *